United States Patent [19]
Fuller

[11] Patent Number: 6,148,859
[45] Date of Patent: Nov. 21, 2000

[54] HYDRAULIC CONTROL VALVE ASSEMBLIES FOR HYDRAULIC BRAKING SYSTEMS

[75] Inventor: Robert Gregory Fuller, Coventry, United Kingdom

[73] Assignee: Lucas Industries, plc, Solihull, United Kingdom

[21] Appl. No.: 09/201,561

[22] Filed: Nov. 30, 1998

Related U.S. Application Data

[63] Continuation of application No. PCT/GB97/01307, May 14, 1997.

[51] Int. Cl.$^7$ .............................. F16R 31/02; B60T 8/36
[52] U.S. Cl. .............................. 137/625.65; 137/596.17; 303/119.2
[58] Field of Search ................... 137/625.65, 596.17; 303/119.1, 119.2

[56] References Cited

U.S. PATENT DOCUMENTS

| | | | |
|---|---|---|---|
| 3,880,476 | 4/1975 | Belart et al. | 303/119.2 |
| 4,422,475 | 12/1983 | Aspinwall | 137/596.17 X |
| 5,076,538 | 12/1991 | Mohr et al. | |
| 5,163,474 | 11/1992 | Rizk | 137/596.17 |
| 5,221,129 | 6/1993 | Takasaki | 303/119.2 |
| 5,306,076 | 4/1994 | Tyler | 137/596.17 X |
| 5,445,447 | 8/1995 | Farr et al. | 303/119.1 X |
| 5,678,902 | 10/1997 | Farr et al. | 303/119.2 X |

FOREIGN PATENT DOCUMENTS 195 37 349   4/1996   Germany.

*Primary Examiner*—John Rivell
*Attorney, Agent, or Firm*—MacMillan Sobanski & Todd, LLC

[57] ABSTRACT

A solenoid-controlled valve assembly comprises a solenoid (1) for controlling operation of a spool valve (2), and the solenoid is contained within a solenoid body (3). The spool valve comprises a spool (40) working in a bore (41, 42) in a spool housing (12), and the housing is, in turn, sealingly received in a spool body (10). The housing (12) may be of differential area and may be sealingly received in a complementary stepped bore (11) in the spool body, with the housing arranged in such a manner that when subjected to equal pressures over different area a resultant force tends to urge the housing in a given direction. In a modification the housing (12) may be resiliently biased away from the spool body (10) and relatively towards the solenoid (1) by a resilient member such as an annular ring (70) of elastomeric material, or a spring washer (71).

10 Claims, 3 Drawing Sheets

HYDRAULIC CONTROL VALVE ASSEMBLIES FOR HYDRAULIC BRAKING SYSTEMS

CROSS REFERENCE TO RELATED APPLICATIONS

This application is a continuation of International Application No. PCT/GB97/01307, filed May 14, 1997, which claims priority from British Patent Application No. 9611534.0, filed Jun. 1, 1996.

BACKGROUND OF THE INVENTION

This invention relates to hydraulic control valve assemblies for vehicle hydraulic braking systems, for example for braking systems of the electro-hydraulic type.

Known hydraulic control valve assemblies, for example solenoid-control valve assemblies for use in electro-hydraulic vehicle braking systems, typically incorporate a spool working in a bore in which movement of the spool acts to connect and disconnect passages for providing communication between an hydraulic power source, brake, and an hydraulic master cylinder. Such spools and the respective housings provided with the bores in which the spools work have to be manufactured to high accuracy and very small tolerances in order to ensure that any leakage around the spool or across edges of the spool is reduced to an absolute minimum. Since the clearance between the spool and the housing is very small, care must be taken to avoid or eliminate any imperfections or distortions in the bore which could cause the spool to stick or lock at least during attempted movement within the housing. Since the spool housing has to be secured within a body in a fluid tight chamber, it is usual to clamp a housing by using a plate, or the body of the solenoid, up against the bottom of the bore within the body in which the housing is received. The application of a clamp load can, if sufficiently large, cause distortion of the housing bore to a degree sufficient to prevent the spool, itself, from moving freely within the bore in the housing. As the effective length of the housing, and the depth of the bore within the body and in which the housing is received, can vary from one assembly to another so can the clamp load since the extent of the clamp load depends upon the interference presented by the housing with respect to the clamp plate or the body.

SUMMARY OF THE INVENTION

According to one aspect of our invention in an hydraulic control valve assembly comprising a spool valve, the spool valve comprises a spool working in a bore in a spool housing, and the housing is, in turn, sealingly received in a spool body, biasing means being incorporated for urging the spool housing in a given direction.

This has the effect of preventing distortion of the spool housing due to excessive loads, with consequent distortion of its bore, whereby to eliminate the possibility of the spool sticking within the bore in which it works.

The biasing means may be defined by constructing the spool housing of differential area, with the housing received in a complementary stepped bore in the spool body, and the housing being arranged in such a manner that when subjected to equal pressures over different areas a resultant force tends to urge the housing in the said given direction.

When operation of the spool valve is controlled by a solenoid contained within a solenoid body, a sealing diameter of the housing remote from the solenoid body may be of a diameter smaller than a sealing diameter of the remainder of the housing. Thus the spool housing will be subjected to resultant force acting to urge in a direction towards the solenoid body as a result of high-pressure fluid, for example in an hydraulic accumulator, acting over the two areas and being effective to clamp it with respect to the solenoid body which, itself, is rigid with the spool body.

Since the spool housing is now clamped against the bodies by a resultant force dependent upon the pressure stored in the accumulator, it is possible to guarantee a suitable clamp load to hold the spool housing against a datum face presented by the solenoid body without over clamping the spool housing, whereby to avoid distortion of the bore in which the spool works.

In another construction the biasing means comprises a resilient device acting between the spool body and the spool housing to bias the spool housing relatively away from the spool body.

The resilient device is resiliently deformed as the solenoid is secured in position with the spool housing urged inwardly into the spool bore.

Thus the spool housing can be held against a datum face presented by the spool body by compliant biasing and without the use of fluid pressure. This avoids over clamping the spool housing, whereby to avoid distortion of the bore in which the spool works.

The resilient device may comprise an annular ring of elastomeric material, suitably an "O" ring, or it may comprise a Belleville or other spring washer.

The resilient device may be positioned between the inner end of the spool housing and a shoulder or step at the complementary or inner end of the spool body.

Preferably the spool is of differential outline and the bore in which it works is of complementary stepped outline so chosen that, in operation, a feed back force is transmitted to an armature of the solenoid to counteract the force developed by the solenoid due to fluctuations in pressure applied to the brakes, and which acts on opposite ends of the spool.

The spool and the spool housing may each comprise a single component. However such components are difficult to manufacture in view of the close tolerances required, both with regard to the external dimensions of the housing, a stepped bore in the housing, and the external diameters of the spool.

It is preferred, therefore, and according to another aspect of our invention to construct the spool and the spool housing each in the form of first and second spool members which co-operate at adjacent ends, and first and second housing components, which also co-operate at adjacent ends.

Conveniently one spool member works in a complementary bore in a corresponding housing component, and the other spool member works in a complementary bore in the other housing component.

One of the housing components is of external differential outline of which the diameter of the portion of greater area corresponds with the external diameter of the other housing component.

We therefore produce two relatively simple, as well as relatively short, spool members which can easily be manufactured and which when assembled eliminate the problems associated with concentricity between the respective diameters at the ends of the spool valve. The spool members themselves still operate as a single spool with the pressure acting across the outer ends of the spool members providing a necessary holding force to maintain the two spool members in close co-operation.

Some embodiment of our invention are illustrated in the accompanying drawings in which:

DETAILED DESCRIPTION OF THE PREFERRED EMBODIMENT

Figure 1:
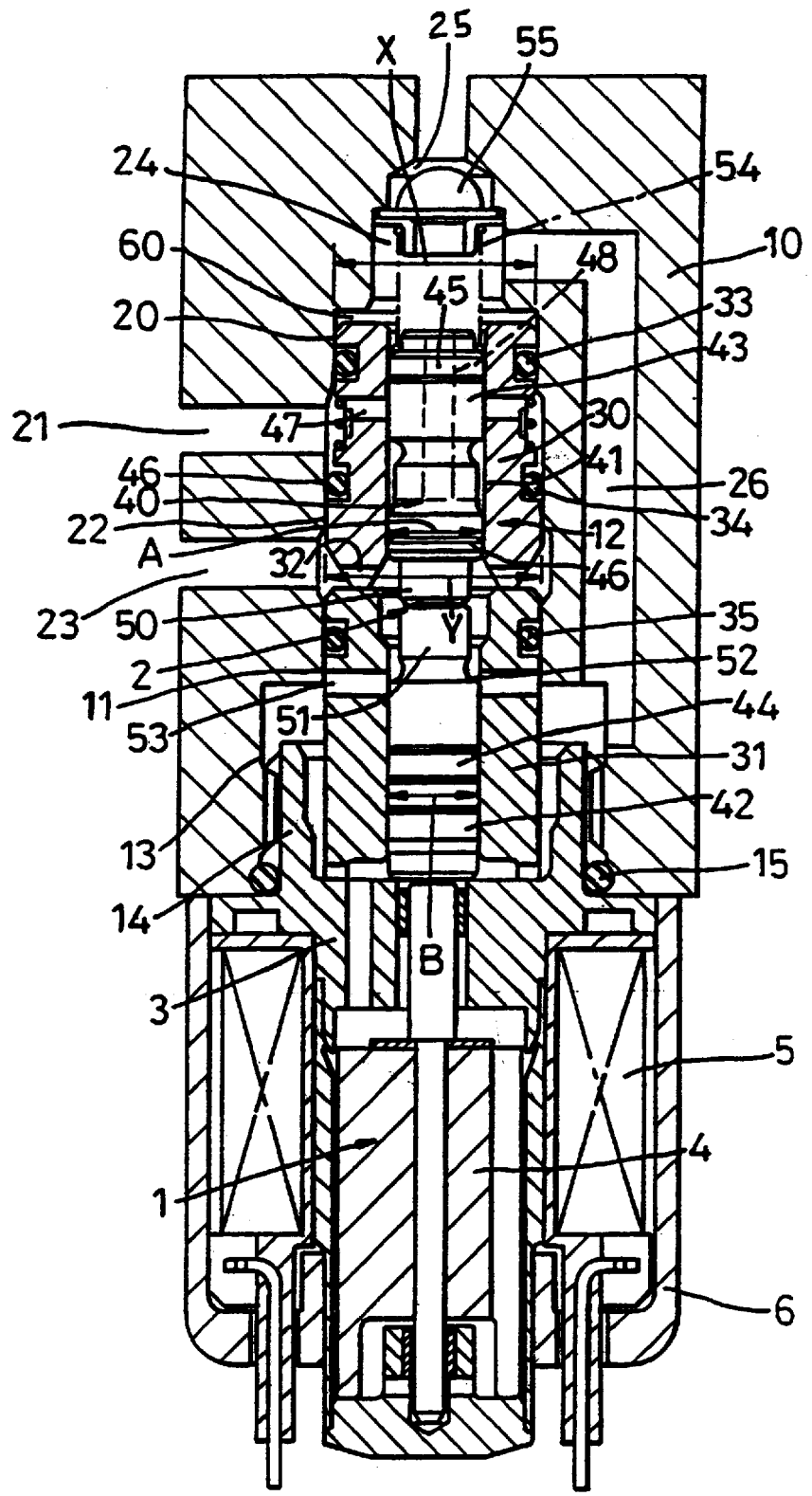
FIG. 1 is a longitudinal cross-section through a solenoid-controlled valve assembly with brakes in an off or released position.

The solenoid-controlled valve assembly illustrated in the drawings comprises a solenoid 1 for controlling operation of a spool valve 2.

The solenoid 1 comprises a solenoid body 3 in which an armature 4 is axially displaceable in response to energisation of a coil 5 surrounding the armature 4. The coil 5 is enclosed within a casing 6.

The spool valve 2 comprises a spool body 10 provided with a stepped, longitudinally extending, bore 11 in which a housing 12 is received for limited movement in an axial direction. The bore 11 is counter bored at 13, at its end of greater diameter and is internally screw threaded to receive an externally screw threaded extension 14 at the forward end of the solenoid body 3. A sealing ring 15 is clamped between the counter bore 13 and the extension 14.

The bore 11 has a first bore portion 20 of smaller diameter and of area 'X' at the end remote from the solenoid and which is disposed on one side of a first radial port 21 for connection to an hydraulic accumulator (not shown). The port 21 leads into a second bore portion 22 of greater diameter and into which second radial port 23 for connection to a tank for hydraulic fluid (not shown) also leads and which terminates in the counter bore 13. The second bore portion 22 is of area 'Y'. At the end remote from the first bore portion 20, the bore 11 leads into a chamber 24, in turn terminating in an axial passage 25 of the jurist area for connection to brakes (not shown). An internal passage 26 connects the chamber 24 to the counter bore 13.

The housing 12 comprises first and second housing components 30 and 31 which abut at adjacent ends with radial passages 32 defined between the housing components 30, 31 communicating with the second radial port 23. The first housing component 30 is of stepped outline and carries spaced seals 33, 34 which engage sealingly with a respective bore portions 20 and 22. The second housing component 31 carries a seal 35 for sealing engagement with the bore portion 22.

A spool 40 works in co-axial bores 41 and 42 in the housing components 30 and 31, of which the bore 41 is of greater diameter than the bore 42. Specifically the bore 41 is of area 'A', and the bore 42 is of area 'B'. The spool 40 comprises a first spool member 43, and the second spool member 44. The spool members 43 and 44 are in abutment at adjacent ends. The spool member 43 has spaced lands 45, 46 which work in portions of the bore 41 on opposite sides of a radial port 47 in the housing component 30, with passages 48 in the spool member 43 leading from a space between the lands 45, 46 into the chamber 24. The spool member 44 works in the bore 42. Reduced diameter portions 50, 51 at the adjacent ends of the spool members 43 and 44 are in abutment, and a shoulder 52 and a step in diameter between the spool diameter of the spool member 44 and the reduced diameter portion 51 co-operates with a radial port 53 in communication with the passage 26.

When the brakes are in an off or released position the components of the solenoid valve assembly are in the relative positions shown in FIG. 1 of the drawings, with the spool 40 urged towards the solenoid body 3 by means of a spring 54 acting between the spool 40 and an abutment 55.

As illustrated the end of the first housing component 30 remote from the component 31 is spaced from a shoulder 60 between that end of the bore 11 and the chamber 34, by a small clearance.

The accumulator is isolated from the brakes by the land 45 closing the passage 47 and the brakes are in free communication with the reservoir through the passage 26, the port 53 and the radial port 53.

When the solenoid 1 is energised to apply the brakes, the armature 4 urges the spool 40 relatively towards the opposite end of the body 10, initially to cause the shoulder 52 to close the radial port 53 leading to the reservoir, and subsequently to cause the land 45 to open the port 47 so that fluid from the accumulator is then supplied to the brakes through the passage 48 in the spool 40.

Due to the provision of the internal passage 26 in the body 10 the outer ends of both spool members 43 and 44 are subjected to equal pressure from the hydraulic accumulator.

Figure 2:
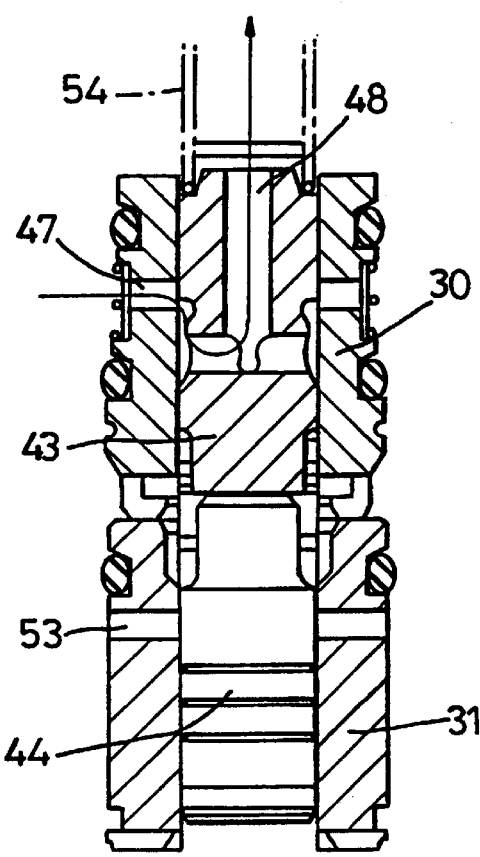
FIG. 2 shows the relative positions when the valve assembly is operated to apply the brakes.

Equal pressures are therefore applied from the hydraulic accumulator over the different areas X and Y of the housing 12, and the different areas A and B of the spool 40. This defines biasing means acting in such a manner that the housing 12 is subjected to a resultant force which urges it against the solenoid body 3. The body 3 defines a datum face, and the spool 40 is urged in a corresponding direction to apply a feedback force to the armature 4 in order to counteract the force developed by the solenoid 1 due to fluctuations in pressure applied to the brakes. The relative positions of the components with the brakes applied are illustrated in FIG. 2 of the accompanying drawings.

Should it be desired to hold the brakes 'on' at a controlled pressure, the energising current applied to the coil 5 is reduced, or pulsed. This permits the armature 4 and the spool 40 to retract so that the land 45 closes the passage 47, but not through a distance sufficient for the shoulder 52 to uncover the port 53.

When the brakes are released by cutting off the energising current to the coil 5, the solenoid-controlled valve assembly is restored to the initial position illustrated in FIG. 1 with the brakes isolated from the hydraulic accumulator, and with braking pressure relieved to the reservoir through the internal passage 26 and the radial port 23.

Figure 4:
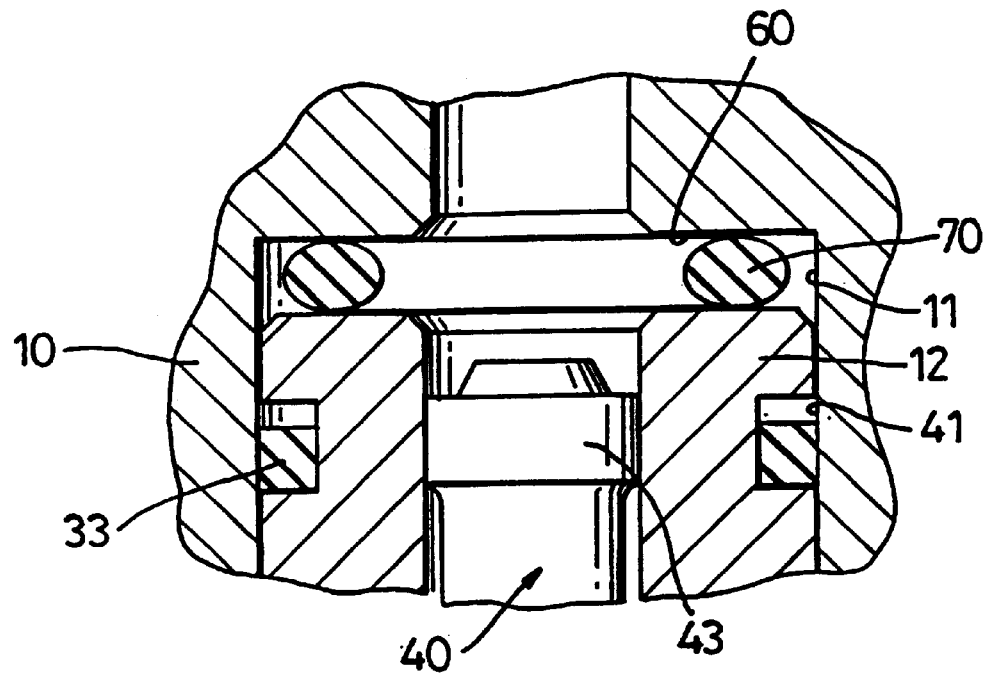
FIG. 4 is a view of the inner end of the spool body showing a modification.

In the modified construction illustrated in FIG. 4 of the accompanying drawings, the biasing means comprise an "O" ring in the form of an annular ring 70 of resilient elastomeric material which is disposed between the inner end of the spool housing 12 and the shoulder 60.

The material of the ring 70 is resiliently deformed as the solenoid is screwed in position with the spool housing 12 urged inwardly into the spool bore 41.

Since compliant biasing is provided by the resilience of the ring 70, and not by fluid pressure acting over chosen areas, it is not necessary to construct the external face of the spool housing 10 and the bore 11 of complementary stepped outline. The construction can therefore be simplified.

Figure 3:
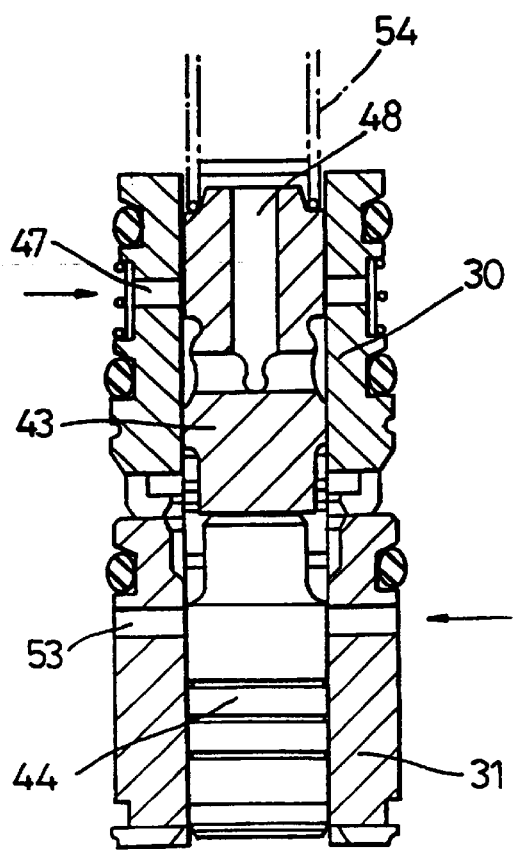
FIG. 3 shows the valve assembly in a position in which the brakes are held 'on'.

The construction of FIG. 4 is otherwise the same as that of FIGS. 1 to 3 and corresponding reference numerals have been applied to corresponding parts.

Figure 5:
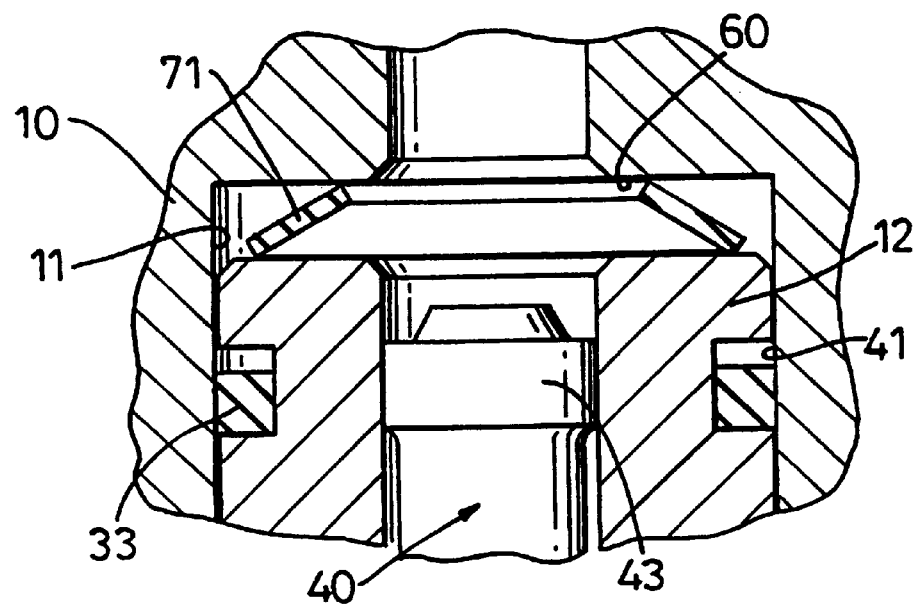
FIG. 5 is a view similar to FIG. 4 showing a different construction of biasing means.

In the modified construction illustrated in FIG. 5, the "O" ring 70 is replaced by a Belleville or spring washer 71 which again subjects the spool housing 12 to a resilient biasing force in a similar manner to that of, the "O" ring 70.

What is claimed is:

1. A hydraulic control valve assembly comprising:

a spool valve, wherein said spool valve comprises a spool body, a spool housing having a bore, a spool working in said bore, and said housing in turn being sealingly received in said spool body, wherein biasing means are incorporated for urging said spool housing in a given direction, wherein said biasing means are defined by constructing said spool housing of differential area, and said spool body being provided with a complementary stepped bore in which said housing is received, said housing being arranged in such a manner that when subjected to equal pressures over different areas, a resultant force tends to urge housing in the said given direction.

2. A valve assembly according to claim 1, and having a datum face, wherein a sealing diameter of said housing is of a diameter smaller than a sealing diameter is of the remainder of said housing, whereby said spool housing is subjected to a resultant force acting to urge said housing in a direction towards said datum face as a result of high-pressure fluid acting over said two different areas, and being effective to clamp said housing with respect to said datum face.

3. A hydraulic control valve assembly comprising:

a spool valve, wherein said spool valve comprises a spool body, a spool housing having a bore, a spool working in said bore, and said housing in turn being sealingly received in said spool body, wherein biasing means are incorporated for urging said spool housing in a given direction, wherein said biasing means comprise a resilient device acting between said spool body and said spool housing to bias said spool housing relatively away from said spool body.

4. A valve assembly according to claim 3, wherein said resilient device comprises an annular ring of elastomeric material.

5. A valve assembly according to claim 3, wherein said resilient device comprises a spring washer.

6. A valve assembly according in claim 3, wherein said spool housing has an inner end, and said spool body has a shoulder at a complementary inner end, and wherein said resilient device is positioned between said inner end of said spool housing and said shoulder on said spool body.

7. A hydraulic control valve assembly comprising:

a spool valve, wherein said spool valve comprises a spool body, a spool housing having a bore, a spool working in said bore, and said housing in turn being sealingly received in said spool body, wherein biasing means are incorporated for urging said spool housing in a given direction, incorporating a solenoid body, and a solenoid contained within said solenoid body for controlling operation of said spool valve, said solenoid having an armature, wherein said spool is of differential outline and said bore in which said spool works is of complementary stepped outline so chosen that, in operation, a feed back force is transmitted to said armature of said solenoid.

8. A hydraulic control valve assembly comprising:

a spool valve, wherein said spool valve comprises a spool body, a spool housing having a bore, a spool working in said bore, and said housing in turn being sealingly received in said spool body, wherein biasing means are incorporated for urging said spool housing in a given direction wherein said spool and said housing are each respectively in the form of first and second spool members, which co-operate at adjacent ends, and first and second housing components, also which co-operate at adjacent ends.

9. A valve assembly according to claim 8, wherein one spool member works in a complementary bore in a corresponding one of said housing components, and the other spool member works in a complementary bore in the other one of said housing components.

10. A valve assembly according to claim 8, wherein one of said housing components is of external differential outline and the diameter of a portion which is of greater area corresponds with the external diameter of said other housing component.

* * * * *

UNITED STATES PATENT AND TRADEMARK OFFICE
CERTIFICATE OF CORRECTION

PATENT NO.   : 6,148,859
DATED        : November 21, 2000
INVENTOR(S)  : Robert Gregory Fuller It is certified that error appears in the above-identified patent and that said Letters Patent is hereby corrected as shown below:

On the cover page of the patent, the following should be inserted:
[30]           Foreign Application Priority Data
       June 1, 1996 [UK] United Kingdom.............9611534.0

Signed and Sealed this

Twelfth Day of June, 2001

*Attest:*

*Attesting Officer*

NICHOLAS P. GODICI
*Acting Director of the United States Patent and Trademark Office*